Feb. 22, 1927.
E. HASSIG
1,618,588
STEERING GEAR MECHANISM
Filed July 13, 1925  2 Sheets-Sheet 1
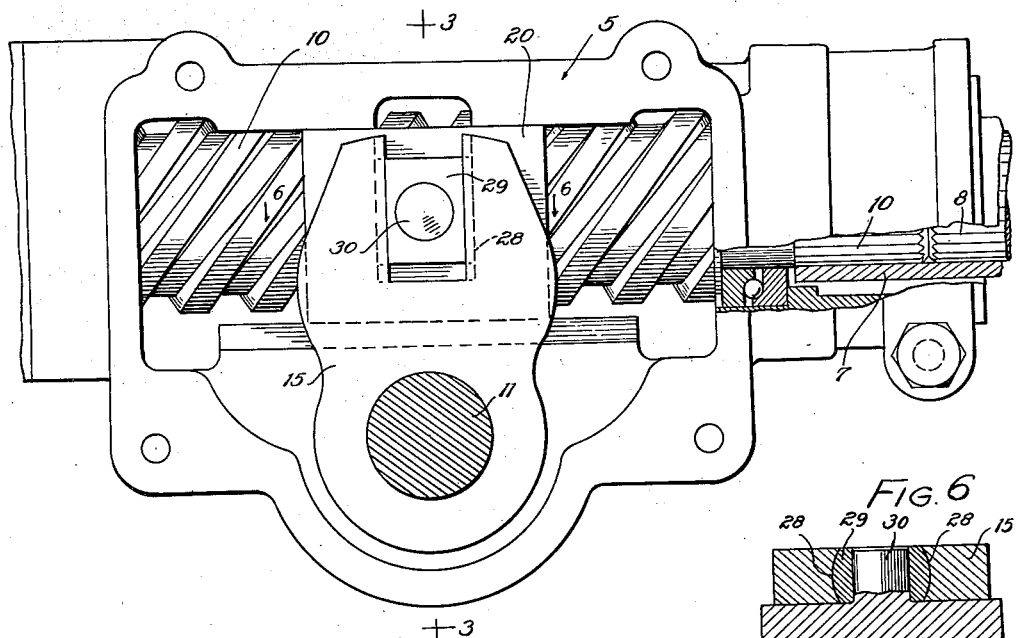
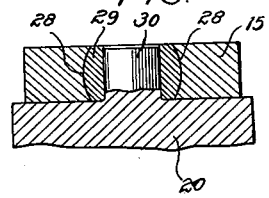
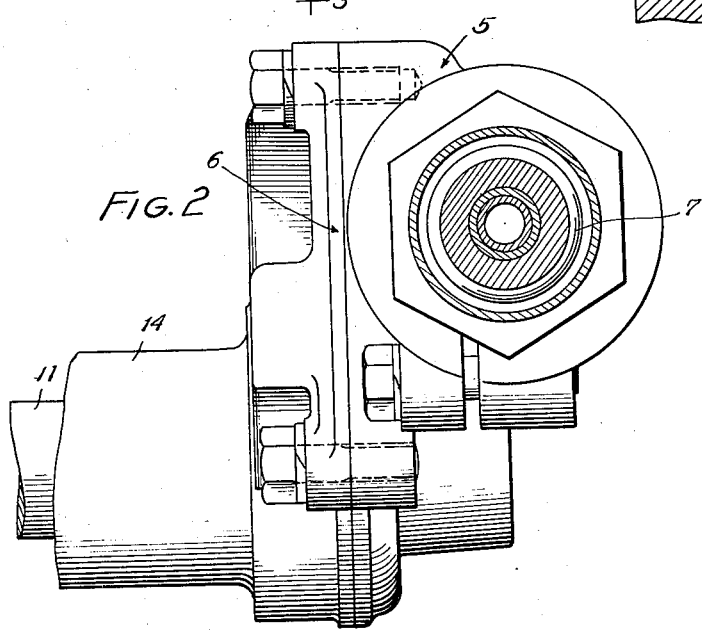
INVENTOR.
Edward Hassig
BY
Erwin, Wheeler & Woolard
ATTORNEY.

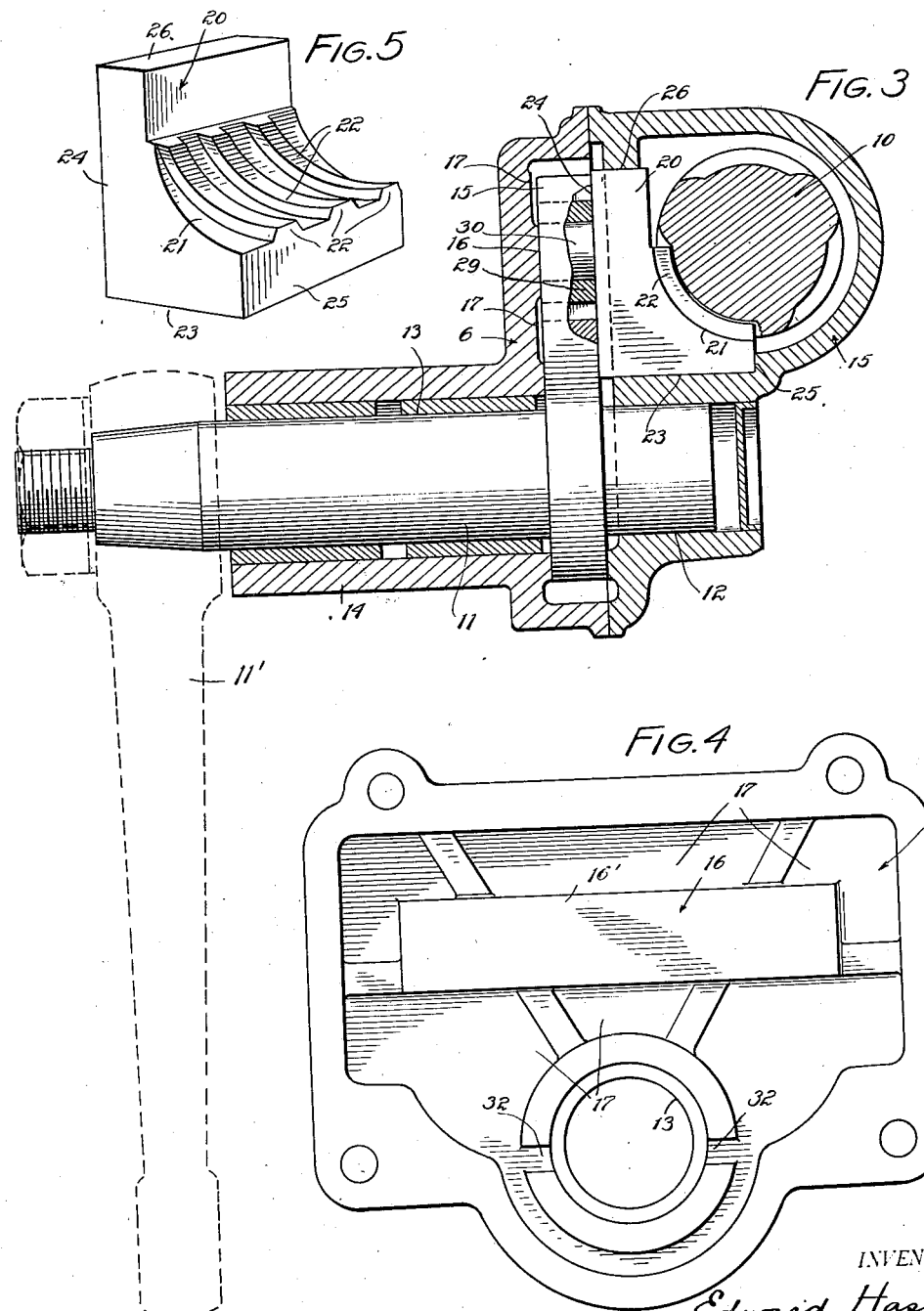

Patented Feb. 22, 1927.

1,618,588

UNITED STATES PATENT OFFICE.

EDWARD HASSIG, OF MILWAUKEE, WISCONSIN, ASSIGNOR TO HANNUM MANUFACTURING COMPANY, OF MILWAUKEE, WISCONSIN.

STEERING-GEAR MECHANISM.

Application filed July 13, 1925. Serial No. 43,143.

This invention relates to improvements in steering gear mechanisms of the general type in which a screw acts upon a nut or nut segment connected to a rock shaft for the oscillation thereof. It is the primary object of the present invention to provide novel and improved means in compact and inexpensive form for transmitting motion between a screw and a transverse rock shaft with a minimum of friction and with a maximum factor of irreversibility in proportion to the pitch of the thread used in the screw.

As will hereinafter be more particularly disclosed, I have found that great economies in manufacture result from the use of a nut meshing with the screw for less than 180°, and preferably for approximately 90° only. Such a nut can be more accurately cut than is possible in the case of a half nut or full nut, may be tempered without distortion, and greatly facilitates the assembly of steering gear mechanism in which it is used. I have made it practicable by the use of such a nut to reduce greatly the dimensions of a steering gear and also to reduce the friction between the operating parts.

In the drawings:

Figure 1 is a side elevation of an embodiment of this invention showing the working parts as they appear when the cover plate of the gear housing is removed.

Figure 2 is an end elevation of the housing shown in Figure 1.

Figure 3 is a view taken in section through the housing and screw on line 3—3 of Figure 1 and exposing the working parts in elevation.

Figure 4 is a detail view in plan of the interior of the cover plate for the housing.

Figure 5 is a detail view illustrating in perspective a quarter nut embodying this invention.

Figure 6 is a detail view in transverse section through the rocker arm and associated parts to which motion is transmitted by the nut, the view being taken in the plane indicated at 6—6 in Figure 1.

Like parts are identified by the same reference characters throughout the several views.

The housing for my improved steering gear mechanism is divided into a casing member 5 and a cover member 6. Suitable bearings are provided in the ends of casing member 5 for the driving spindle screw 10, which is provided with threads in one direction, although it preferably has a plurality of threads as shown. A sleeve 7 may be used to connect the screw with the steering wheel shaft 8 in the usual manner. Obviously, the screw is the driving element in the train herein disclosed.

The driven element preferably consists of a rock shaft 11 provided at 12 with a bearing in casing 5 and having a more extended bearing at 13 within a sleeve 14 which projects laterally from the cover plate 6. Exteriorly of the casing this rock shaft carries an arm 11′ which transmits oscillatory steering movement to the wheels of a vehicle in accordance with the oscillation of the rock shaft.

Fast upon rock shaft 11 is a crosshead or arm 15 which is disposed between bearings 12 and 13 and is preferably made in the peculiar form best shown in Figure 1. The position of this arm is preferably such that its entire face substantially coincides with the plane in which the cover plate 6 is bolted to the casing 5. The cover plate 6 has a bearing surface 16 for the outer face of arm 15, and this latter bearing surface is preferably provided with a plurality of recesses or pockets 17 adapted to receive and retain lubricant. Preferably, however, the portion 16′ of the bearing surface provides a continuous and unbroken path for the support of arm 15 during its oscillatory movement.

To the extent thus far described, the present embodiment of this invention is similar to, although not identical with, other steering gear mechanisms. The present invention resides particularly in the means employed for transmitting movement between the screw and arm 15.

Interposed between the arm 15 and screw 10 is a nut 20 which meshes with the screw and is in sliding bearing contact with the arm and with portions of the casing member 5. This nut is peculiar in that it is made in the form of a slide having a concave surface 21 upon which are formed the raised thread segments 22 which mesh with the screw. It is of the essence of the present invention that the nut shall mesh with the screw for materially less than 180°, and shall preferably be substantially a quarter nut similar to that illustrated in the accompanying drawings, in which there is exactly 90° of mesh between the nut and the screw 10.

The nut 20 is provided with bearing surfaces 23 and 24 at right angles to each other which contact respectively with complementary surfaces on casing member 5 and arm 15. These surfaces receive and absorb the radial thrust resulting from the interaction of the screw and quarter nut and thus prevent the separation of the screw and nut.

Steering gears frequently bind and develop excessive friction, of which the cause has not hitherto been satisfactorily explained. Attempts have been made to overcome this friction by lengthening the bearings of the screw, and while these attempts have been successful to the extent that distortion of the screw was the cause of a portion of this friction, nevertheless it is a fact that such changes as have been made along these lines have only partially solved the problem. I have found that this friction is due primarily to two causes. In the first place, it is very expensive and very difficult, if not impossible, to cut an internal helical thread with perfect accuracy. The difficulty is multiplied when it is attempted to employ a compound thread. In the event that the nut segment extends about a sufficient portion of the periphery of the screw so that the thrust exerted in one portion of the segment is transmitted through another portion thereof to the screw, the slight inaccuracies which necessarily result in the machining of the internal thread in the nut cause the nut and screw to bind and thereby to develop excessive friction. Such friction is at its maximum where a full 360° nut is employed. It is, however, almost equally bad where the common half nut having substantially 180° of peripheral contact with the screw is employed. If, however, the arcuate extent of the nut is cut below 180° in accordance with the disclosure herein, the difficulty due to this particular cause rapidly diminishes until with a quarter or 90° nut it is no longer experienced. It may be pointed out that it is comparatively simple to machine accurately the plane bearing surfaces 23 and 24 and the complementary surfaces of the casing 5 and arm 15. It is, however, as explained above, very difficult, if not impossible, to machine accurately the surfaces of the threads of the screw and nut. In the present embodiment of the invention the entire thrust is sustained by these plane surfaces, whereas in the case of a half nut, or a nut having greater than 180° extent, practically the whole of this thrust is sustained by the screw itself.

The second cause productive of excessive friction in steering gear mechanisms lies in the difficulty of providing adequate lubrication. In the variety of strains to which steering gear mechanism is subject, there are some strains which tend to cause the nut and screw to mesh too closely, thereby squeezing the lubricant from between the threads of the nut and screw and developing the excessive friction, which it is the principal object of this invention to avoid. The nut and screw should be kept as nearly as possible in a fixed position of mesh such that there will, to a maximum extent, be an interposed film of lubricant between their interacting surfaces. This is accomplished in devices embodying the present invention through the provision of bearing surfaces 25 and 26 which are formed on the nut or slide 20 at right angles to each other and parallel respectively to surfaces 24 and 23 of the nut. The casing member 5 provides complementary bearing surfaces for interaction with surfaces 25 and 26 to limit the movement of the nut radially in the direction of the axis of screw 10. The provision of surfaces 25 and 26 constitutes the principal means whereby I maintain lubricant between the screw and the nut. Another feature of this device which co-operates to the desired end consists in the use of a compound or multiple thread whereby the force exerted by the screw upon the nut is divided between a plurality of interacting surfaces instead of being restricted to a single surface. Here again the use of a nut having a peripheral extent of less than 180° is important inasmuch as it is generally considered that a compound threaded nut having a peripheral extent of 180° or more will have but one of its threads actually interacting with a corresponding thread of the screw at any given time. Tests made in practice with a device constructed in accordance with the disclosure herein indicate that where a quarter nut is used it is possible to cut the threads with sufficient accuracy so that the bearing surfaces of all threads will interact simultaneously with complementary surfaces of threads in the screw.

Where it is desired, as in the present case, to keep the overall dimensions of the steering gear mechanism as small as possible, there is obviously a need for a nut or slide 20 which will not exceed a given length. Where the nut is thus made relatively short it may tend to bind or cramp unless ample guidance is provided for it. If a single thread screw is used at 10 with the lead which is necessary for this screw, the length of nut 20 will not permit of the formation of more than one of the segmental threads 22 therein. This has a tendency to localize at one point in the nut the thrust exerted by the screw and, accordingly, for this reason also I prefer to use a multiple thread screw having at least two or three threads so that two or three segments can be formed at 22 upon the nut. I have found that by so doing I have avoided another source of friction to which steering gear mechanism employing a quarter nut would be peculiarly subject.

In order further to avoid any possibility for cramping to occur, I prefer to use a flexible connection between the nut 20 and the arm 15 which is actuated thereby. The arm 15 is provided with a radially extending slot having its side walls 28 cylindrically curved about the radial axis of the slot. A slide 29 is reciprocable in this slot and is formed with cylindrical surfaces concentric with the margins of the slot and complementary thereto, whereby the slide may not only be reciprocated along the radial axis of the slot but may be oscillated about said axis to correct for any slight inequalities in the bearing surfaces of the mechanism embodying this invention. Nut 20 carries a stud 30 which is journaled in an opening in slide 29 upon an axis normal to the axis upon which such slide reciprocates and is oscillatable.

The arrangement is such that arm 15 is acted upon with variable mechanical advantage. The nut 20 and its stud 30 have a linear motion in a plane which includes the axis of screw 10. Arm 15 has an oscillatory motion during which slide 29 moves radially of said arm. In the extreme positions of the nut, slide 29 will be more remote from the axis of rock shaft 11 than is the case when the parts are in the position shown in Figure 1, and, consequently, will exert its force on the rock shaft with greater leverage in the extreme positions of the rock shaft. This is important inasmuch as the resistance to dirigible movement of the wheels of a vehicle increases as such wheels approach their limits of movement. The greater leverage obtained by the mechanism herein disclosed permits the operator to overcome this greater resistance without increased effort. It will be noted that the bearing surface which extends at 16' along the interior of cover plate 6 is parallel with the axis of screw 10 and consequently is at all times supporting that portion of rocker arm 15 which is being acted upon by stud 30.

Referring to Figure 4, attention is called to the fact that the recesses 17 upon either side of the bushing 13 communicate with each other about the bushing, and the bushing itself is notched at 32 to provide a passageway for lubricant. The operation of this device with regard to lubricant is somewhat different from the operation of other steering gear mechanisms, since in the present structure the uni-directional thread of the screw and the fact that a single nut is employed, permit the device to be designed so that this nut acts somewhat as a plunger to displace lubricant from one end of the housing and to force it to the other end thereof during the reciprocation of the nut. To ensure such operation the housing is preferably fitted comparatively closely about the screw, and the several bearing surfaces are all so formed as to be comparatively narrow in transverse extent and to have recesses closely adjacent thereto and adapted to convey to the bearing surfaces such lubricant as is displaced by the reciprocating nut. Thus the bearing surface at 16 and the surfaces of the arm 15 and housing 5 which cooperate with the nut are all fed with lubricant by suitable passageways, and likewise the lubricant is caused to pass through notches 32 to the bearing 13 and through corresponding notches to the bearing 12. The continual movement of lubricant within the housing when the lubricant is displaced by the reciprocation of the nut 20 ensures that all of the bearing surfaces will be kept properly greased, the housing being so designed that when it is supplied with a reasonable amount of lubricant displacement thereof must occur in the manner above indicated.

It will be seen from the foregoing description of the present embodiment of this invention that I have satisfied the objects of the invention by providing an extremely compact steering gear mechanism in which friction is avoided by provision for proper lubrication, by means which prevent an excessive degree of mesh between the screw and the nut, and by the use of a nut having less than 180° of mesh with the screw, whereby radial thrust is transmitted to bearing surfaces on the housing and on arm 15 instead of being sustained by comparatively inaccurately machined screw threads on the opposite side of the screw. Of the above listed means for avoiding friction the last is, of course, the most important for reasons fully explained above.

Incidentally, the device herein disclosed also avoids friction because of the fact that the quarter nut can be more accurately machined than any nut heretofore used in steering gear mechanism and may be tempered without the distortion which is so commonly experienced in tempering the ordinary type of nut. Furthermore, due to the fact the nut is in direct bearing contact with arm 15, I have not only ensured the most accurate alignment of these parts, but have also reduced wear due to the fact that the hardened surface of the tempered arm 15 is far less subject to wear than is the cast metal of which the housing is ordinarily constructed. I find that in practice the cost of assembling the steering gear made in accordance with the disclosure herein is very materially less than the cost of assembling a gear in which a half nut is used. This is due in part to the fact that there is but one position in which the nut will fit within the casing member 5, and is also due to the construction of the housing whereby the casing member and its cover plate are joined in the plane of contact of nut 20 and arm 15.

I claim:

1. In a device of the character described, the combination with a screw and a housing, of a fractional nut element meshing with said screw and provided with two pairs of opposed bearing surfaces, the surfaces of one pair being convergent away from said screw and the surfaces of the other pair being convergent toward said screw, and said housing being provided with complementary surfaces, whereby to confine said element for movement parallel to said screw without increase or decrease of mesh therewith, the sector of mesh between said screw and said fractional nut element being disposed within the space bounded by the planes of said bearing surfaces.

2. In a device of the character described, the combination with a housing and a screw, of a fractional nut element comprising a block having threads meshing with said screw and provided with four bearing surfaces substantially parallel to the axis of said screw and disposed in planes substantially at right angles to each other, said housing being provided with complementary bearing surfaces and the threads of said element being disposed between two of said surfaces and wholly within said planes, whereby the movement of said element toward said screw is restrained by converging bearing surfaces and the movement of said nut away from said screw is also opposed by convergent bearing surfaces, and substantially none of the thrust on said element is sustained by said screw.

3. In a device of the character described, the combination with a driving screw and an oscillatable driven shaft having their respective axes at right angles and mutually offset, of an arm connected with said shaft and intersecting a plane parallel to the axis of said shaft and including the axis of said screw, a nut operatively connected with said arm to transmit movement thereto and meshing fully with said screw only between said plane and a plane substantially at right angles thereto and parallel to said arm.

4. In a device of the character described, the combination with a driving screw and an oscillatable driven shaft having their respective axes at right angles and mutually offset, of an arm connected with said shaft and intersecting a plane parallel to the axis of said shaft and including the axis of said screw, a nut operatively connected with said arm to transmit movement thereto and meshing fully with said screw only between said plane and a plane substantially at right angles thereto and parallel to said arm, and bearing surfaces operatively confining said nut for reciprocation parallel to the axis of said screw and adapted to limit said nut to a given degree of mesh with said screw.

5. In a device of the character described, the combination with a screw and an oscillatable shaft having mutually offset axes at right angles to each other, of an arm connected with said shaft, and a quarter nut operatively connected with said arm and meshing with said screw, said nut being confined between said screw, said arm and said shaft.

6. In a device of the character described, the combination with a screw, of an L-shaped nut provided intermediate its sides with a concave threaded surface meshing with said screw, the peripheral extent of mesh between said screw and said nut being limited to approximately 90°, and a casing providing bearing surfaces complementary to the sides of said nut and adapted in operation to limit the degree of mesh between said nut and said screw.

7. In a device of the character described, the combination with a screw and a rock shaft, of an arm connected with said shaft and oscillatable in a plane parallel to the axis of said screw, a nut operatively connected with said arm and in bearing contact with a face thereof, and a casing for said screw and said nut and provided with a bearing surface for said nut at right angles to the said face of said arm and contiguous thereto, said nut having approximately 90° of mesh with said screw.

8. In a device of the character described, the combination with a screw and a rock shaft, of an arm connected with said shaft and oscillatable in a plane parallel to the axis of said screw, a nut operatively connected with said arm and in bearing contact with a face thereof, and a casing for said screw and said nut and provided with a bearing surface for said nut at right angles to the said face of said arm and contiguous thereto, said nut having approximately 90° of mesh with said screw and said 90° of mesh being bounded by radii of said screw normal to said face and said surface.

9. In a device of the character described, the combination with a screw and a rock shaft, of an arm connected with said shaft and oscillatable in a plane parallel to the axis of said screw, a nut operatively connected with said arm and in bearing contact with a face thereof, and a casing for said screw and said nut and provided with a bearing surface for said nut at right angles to the said face of said arm and contiguous thereto, said casing and said nut being provided with additional complementary bearing surfaces adapted to limit the movement of said nut toward the axis of said screw, whereby to limit the depth of mesh of said nut with said screw.

10. In a device of the character described, the combination with a screw and a rock shaft, said rock shaft being provided with an arm movable in a plane parallel to the axis of said screw and being provided with a plane bearing surface facing said screw, of a casing fitted about said screw and provided with a plane bearing surface at right angles to said surface of said arm and contiguous thereto, and a quarter nut confined in the angle between said surfaces and in mesh with said screw, said quarter nut being operatively connected with said arm.

11. In a device of the character described, the combination with a screw and a rock shaft, said rock shaft being provided with an arm movable in a plane parallel to the axis of said screw and being provided with a plane bearing surface facing said screw, of a casing fitted about said screw and provided with a plane bearing surface at right angles to the said surface of said arm and contiguous thereto, a quarter nut confined in the angle between said surfaces and in mesh with said screw, said quarter nut being operatively connected with said arm, and complementary surfaces on said nut and said casing substantially at right angles to each other and parallel to said first mentioned surfaces, respectively, whereby the radial thrust of said nut is taken by said plane surfaces instead of by the threads of said screw.

12. In a device of the character described, the combination with a housing and a screw and a rock shaft journaled in said housing, of an arm on said rock shaft, a bearing surface extending in relief in said housing parallel to the axis of said screw and adapted to provide bearing support for said arm, a slide radially adjustable with reference to said arm, and a quarter nut fitted between said arm, said rock shaft and said screw in mesh with said screw and pivotally connected to said slide in thrust bearing contact with said arm.

13. In a device of the character described, the combination with a screw and a rock shaft disposed at right angles to each other, of an arm connected with said shaft and oscillatable therewith, a nut meshing with said screw in operative connection with said arm and in bearing contact with a face of said arm, and a casing for said screw and said nut provided with a bearing surface for said nut, the disposition of said nut, said arm and said bearing surface being such with reference to said screw that the radial thrust of said screw on said nut is divided between the arm and the said surface of said casing.

14. In a device of the character described, the combination with a housing and a screw and a rock shaft journaled in said housing, of an arm on said rock shaft, a bearing surface formed in relief in said housing laterally adjacent and parallel to the axis of said screw and adapted to provide a bearing support for said arm, a slide radially adjustable with reference to said arm across the area of bearing contact between said arm and said surface, and a fractional nut meshing with said screw for reciprocation axially thereof and operatively connected with said slide and confined between said screw and said arm, whereby at all times to act through said slide upon a portion of said arm which is supported on said surface and to transmit through said arm to said surface a component of the thrust of said screw.

15. In a device of the character described, the combination with a screw and an arm oscillatory in a plane parallel to the axis of said screw and spaced therefrom, of a nut element provided with a stud disposed substantially upon a radius of the axis of said screw and pivotally and slidably connected with said arm, said nut element being provided with threads only upon one side of said radius.

16. In a device of the character described, the combination with a screw and a rock shaft at right angles to each other, of an arm connected with said rock shaft and having its extremity movable in a plane parallel to the axis of said screw, a casing providing spaced bearing surfaces extending axially of said screw, and a nut confined between said surfaces and provided with a stud pivotally and slidably connected with said arm and projecting substantially in the direction of a radius drawn from the axis of said screw, the bearing surfaces between said nut and said casing being disposed on opposite sides of said radius, and said nut being provided with threads upon but one side of said radius.

17. In a device of the character described, the combination with a screw and a rock shaft at right angles to each other, of an arm projecting from said rock shaft and intersecting a plane parallel to the axis of said rock shaft and including the axis of said screw, and a nut operatively meshing with said screw and provided with a stud projecting in said plane and operatively pivotally and slidably connected with said arm, said nut having a thread materially shorter than that of a half nut, said thread being disposed in the angle between said arm and said rock shaft.

EDWARD HASSIG.